(12) United States Patent
Baddini Mantovani (10) Patent No.: US 7,932,859 B2
(45) Date of Patent: Apr. 26, 2011

(54) METHOD AND APPARATUS FOR SATELLITE POSITIONING SYSTEM TIME RESOLUTION

(75) Inventor: Jose Ricardo Baddini Mantovani, Los Altos, CA (US)

(73) Assignee: Motorola Mobility, Inc., Libertyville, IL (US)

( * ) Notice: Subject to any disclaimer, the term of this patent is extended or adjusted under 35 U.S.C. 154(b) by 436 days.

(21) Appl. No.: 12/123,781

(22) Filed: May 20, 2008

(65) Prior Publication Data

US 2009/0289849 A1    Nov. 26, 2009

(51) Int. Cl.
*G01S 19/33*    (2010.01)
(52) U.S. Cl. .................................. 342/357.73
(58) Field of Classification Search ............. 342/357.73; G01S 19/33
See application file for complete search history.

(56) References Cited

U.S. PATENT DOCUMENTS

| | | | |
|---|---|---|---|
| 6,346,911 B1 * | 2/2002 | King ......................... | 342/357.62 |
| 7,095,368 B1 * | 8/2006 | van Diggelen ........... | 342/357.62 |
| 7,489,269 B2 * | 2/2009 | van Diggelen et al. .. | 342/357.67 |
| 7,592,950 B2 * | 9/2009 | van Diggelen ........... | 342/357.62 |
| 2003/0187575 A1 | 10/2003 | King et al. | |
| 2005/0174284 A1 | 8/2005 | Abraham et al. | |
| 2008/0079633 A1 * | 4/2008 | Pon et al. ................. | 342/357.12 |

FOREIGN PATENT DOCUMENTS

| | | |
|---|---|---|
| EP | 1166143 B1 | 3/2003 |
| WO | 0175470 A1 | 10/2001 |

OTHER PUBLICATIONS

Galileo Open Service; Signal in Space Interface Control Document (OS SIS ICD); May 23, 2006.
Arinc Research Corporation, El Segundo, CA; Navstar GPS Space Segment/Navigation User Interfaces, ICD-GPS-200, IRN-200C-004; Apr. 12, 2000.
A Moudrak et al.; Timing Aspects of GPS-Galileo Interoperability: Challenges and Solutions; Dec. 9, 2004.
International Search Report in connection with related PCT Application PCT/US2009/043889 dated Sep. 16, 2009.

* cited by examiner

*Primary Examiner* — Gregory C Issing
(74) *Attorney, Agent, or Firm* — Matthew C. Loppnow; Prass LLP (57) ABSTRACT

A method and apparatus that reduces the number of possible time alignment possibilities to simplify the satellite positioning system time-ambiguity resolution problem is disclosed. The method may include receiving a first signal (160) from a satellite (150) of a first satellite positioning system and receiving a second signal (140) from a satellite (130) of a second satellite positioning system. The first signal can have a first modulation sequence length and the second signal can have a second modulation sequence length different from the first modulation sequence length. The method may also include determining a time offset between the first signal from the satellite of the first satellite positioning system and the second signal from the satellite of the second satellite positioning system based on an estimated propagation delay of the first signal and the second signal. The method may additionally include establishing a position of a satellite positioning receiver (120) based on the time offset.

13 Claims, 7 Drawing Sheets

METHOD AND APPARATUS FOR SATELLITE POSITIONING SYSTEM TIME RESOLUTION

BACKGROUND

1. Field

The present disclosure is directed to satellite positioning systems. More particularly, the present disclosure is directed to satellite positioning system time resolution.

2. Introduction

Presently, in a Global Positioning Systems (GPS), it is possible to obtain a GPS receiver location based on two pieces of information. The first piece of information is the relative propagation delay time of signals coming from different satellites, which is also referred to as pseudo-ranges. The propagation delay from at least four satellites can be necessary for a three-dimensional fix. The second piece of information is the location of each satellite when its signal was transmitted. Once this information is available it is possible to solve a location equation system. The location equation has four variables: three for the position of the receiver ($x_u$, $y_u$, $z_u$) and a fourth for the time offset ($T_u$) between the receiver clock and the GPS system clock. Each satellite location ($x_i$, $y_i$, $z_i$) is determined using ephemeris information, which is a refined model of the satellite orbit. This information can be obtained either directly from the satellites by data decoding or from other sources, like from a GPS assistance server.

Once the ephemeris information is available, the only missing piece of information is time. The absolute time in the GPS time system when the signal was transmitted by the satellite must be known in order to calculate the position. The time information can be obtained by decoding Time Of Week (TOW) information from the satellite in a standalone GPS receiver with a strong radio-frequency (RF) signal coming from the satellites. This information indicates the absolute GPS time of the beginning of the next GPS subframe. Each subframe lasts 6 seconds and a special sequence of bits called a preamble can be used to determine its beginning. If pseudo-range measurements are taken exactly at the beginning of each subframe for each satellite, the TOW information from the previous subframe can be used to calculate the position of each satellite at transmission time. In practice, it is not necessary to use the instant of the beginning of each subframe to take the pseudo-range measurement. In reality, if the location of the signal is known within a given subframe, the time offset can be compensated between that location in time and the beginning of the subframe.

Thus, it can be necessary to determine the relative location of a given instant in time of the received signal within the subframe. This instant in time will be used in the pseudo-range equations. An error in this time extraction process may have serious consequences in the final calculated position accuracy for two different reasons. The first reason is related to the fact that the satellites are moving at a speed of about 4 km/s. A time misalignment of 1 ms common to all satellites being used will result in a satellite location error of about 4 m, which will result in errors of the same order of magnitude in the receiver position calculation. The second reason is much more serious. If one satellite has a time extraction error of just 1 µs relative to the other satellites, this will correspond to an error of 300 meters for the range of that particular satellite, which will cause an error in the same order of magnitude in the final calculated receiver position.

The GPS L1 signal consists of an RF carrier (1.57542 GHz) bi-phased modulated by a 1023-chip long Pseudo-random Noise (PN) sequence. It is a Code Division Multiple Access (CDMA) system, where each satellite has its own unique PN sequence, which works as an identifier and allows for the separation of signals from different satellites. The chip rate is 1.023 Mcps (mega chips per second), and consequently, the transmission of one entire sequence takes 1 ms. Every 20 PN cycles (20 ms), the phase may or may not be inverted, which constitutes a 50 bps data modulation. 30 Data bits constitute one word (600 ms), and 10 words constitute one subframe (6 s). Five subframes constitute a page (30 s). The first 3 subframes carry information needed for position calculation, while the last 2 subframes carry a set of other parameters that are transmitted over 25 pages commuted over 12.5 minutes. Typically, a GPS receiver will have correlators that will try to align an internally generated PN sequence with the incoming signal. Finding a peak in the correlation gives a good measurement of time alignment within the 1 ms duration of the PN sequence. If the signal is strong enough so that the data can be properly demodulated, and if the data capture window is long enough, then the TOW can be obtained and the exact location of any given 1 ms-long PN cycle within the subframe can be determined.

In other situations, due to unfavorable RF conditions, the signal may not be strong enough for bit-by-bit data demodulation, but it may be strong enough so that the peak in the PN correlation can still be determined. This may be possible due to the use of longer integration times. In a typical receiver, this happens when the incoming signal strength for each satellite is below –142 dBm and still above a certain threshold which could typically be in the –155 dBm range. In other cases, the data acquisition time window may be small, not allowing for the correct determination of the location of a particular short sequence of bits within the GPS data stream.

In these cases, part of the time information can still be found within the 1 ms time window of the PN sequence due to chip alignment, which is also referred as code phase information. However, the position of that particular PN sequence is not known within the GPS data stream. In the case of a 6 second-long subframe there are 6,000 possibilities of alignment. This is like having a broken watch with only the minute pointer, but not the hour pointer. In the context of this disclosure, this is what is being called the time ambiguity problem in GPS.

In Assisted-GPS (A-GPS) systems, when coarse time aiding information is provided, which for illustration purposes can be assumed as +/–2 seconds accurate—the search space in the time domain becomes restricted to a 4-second wide window. This window may be positioned within one or two 6-second long subframes. The position of the signal within the 1 ms duration of the PN sequence can be obtained from the correlation process. However, there is still the problem of aligning a given PN sequence beginning within the subframe in the 4-second windows, which gives 4,000 possibilities. There are known methods that can be used to attempt to solve this ambiguity, like the one proposed by Mike King in the U.S. Pat. No. 6,346,911, but they may require some significant amount of processing, given the high number of time alignment possibilities.

Thus, there is a need for a method for reducing the number of possible time alignment possibilities to simplify the satellite positioning system time-ambiguity resolution problem.

SUMMARY

A method and apparatus that reduces the number of possible time alignment possibilities to simplify the satellite positioning system time-ambiguity resolution problem is disclosed. The method may include receiving a first signal from a satellite of a first satellite positioning system and receiving a second signal from a satellite of a second satellite positioning system. The first signal can have a first modulation sequence length and the second signal can have a second modulation sequence length different from the first modulation sequence length. The method may also include determining a time offset between the first signal from the satellite of the first satellite positioning system and the second signal from the satellite of the second satellite positioning system based on an estimated propagation delay of the first signal and the second signal. The method may additionally include establishing a position of a satellite positioning receiver based on the time offset.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
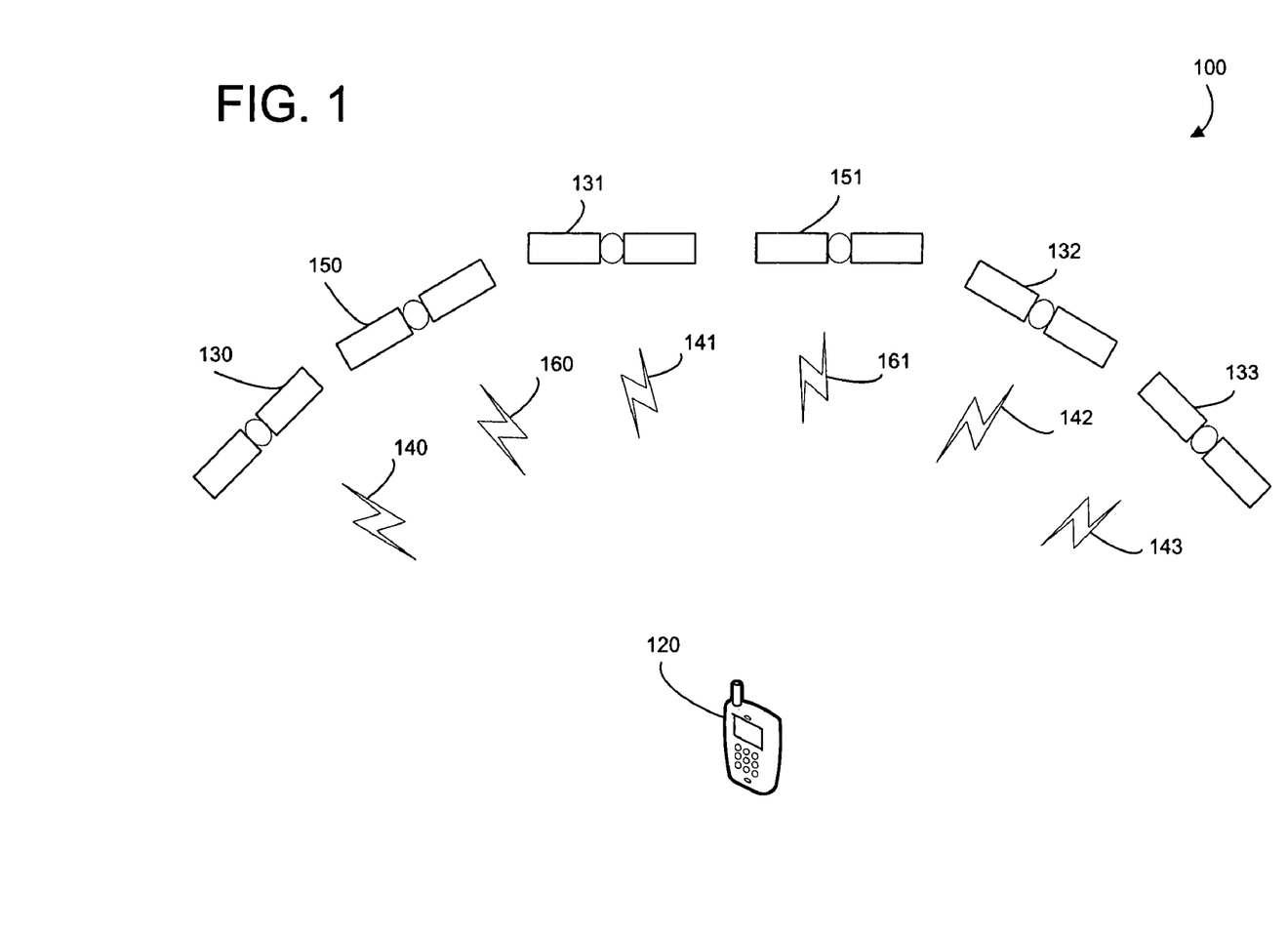
FIG. 1 is an exemplary block diagram of a system according to one possible embodiment.

FIG. 1 is an exemplary block diagram of a system 100 according to one embodiment. The system 100 can include a terminal 120, satellites 150 and 151 from a first satellite positioning system, and satellites 130-133 from a second satellite positioning system. The terminal 120 may be a satellite positioning receiver, or a device including a satellite positioning receiver, such as a wireless communication device, a wireless telephone, a cellular telephone, a personal digital assistant, a pager, a personal computer, a selective call receiver, or any other device that that can use a satellite position system receiver. The satellites 130-133, 150, and 151 may be satellites from different positioning systems, such as from a Global Positioning System (GPS), a Galileo satellite positioning system, a Global Navigation Satellite System, such as GLONASS, or any other satellite positioning system.

In operation, the terminal 120 can calculate its position using signals 140-143 from four or more satellites of the second satellite positioning system. Four satellites may need to be used because the clock offset between the local clock of terminal 120 and the clock of the satellite positioning system may need to be determined. The terminal 120 can then determine the time as well as position. For example, each satellite can have an atomic clock and can continually transmit messages. Each message can contain the current time at the start of the message and parameters to calculate the location of the satellite, such as the ephemeris. The signals can travel at a known speed, which is comparable to the speed of light through outer space and slightly slower through the atmosphere. The terminal 120 can use the arrival time to compute the distance to each satellite, from which it can determine the position of the terminal 120 using geometry and trigonometry. If the local time is known very precisely, this process can determine the terminal's position using three satellites. However, most terminals do not contain clocks of this accuracy because an atomic clock would be required. Thus, a terminal may require tracking four or more satellites so that the terminal can compute its location based on relative signal propagation delays measurements.

To assist in the determination of the time of transmission of the signals 140-143, the terminal 120 can receive a first signal 160 or 161 from a first satellite 150 or 151 of a first satellite positioning system. The terminal 120 can then receive a second signal 140 from a second satellite 130 of a second satellite positioning system. For example, the first satellite positioning system can be a Galileo satellite positioning system and the second satellite positioning system can be GPS satellite positioning system. The terminal 120 can then ascertain a relative transmit time of the first signal 160 relative to an estimated propagation time of the first signal from the first satellite 150. The terminal 120 can then determine a time offset between the first signal 160 and the second signal 150. The terminal 120 can decide a search space for time alignment possibilities for aligning a pseudorandom noise sequence based on the relative transmit time and the time offset. The terminal 120 can estimate a system time of the second satellite positioning system based on the search space using known methods. The terminal 120 can then establish a position of a satellite positioning receiver based on the system time using known methods. Thus, the terminal 120 may make use of a signal 160 and/or 161 transmitted by satellites 150 and 151 of the first satellite positioning system, which can dramatically reduce the number of possible time alignment possibilities for signals 140-143 from satellites 130-133 from the second satellite positioning system. This can consequently greatly simplify the time-ambiguity resolution problem, which can reduce the amount of processing power required, which can be translated into cheaper GPS receiver implementations and/or faster response times.

To elaborate using an example of Galileo for the first satellite positioning system and GPS for the second satellite positioning system, the Galileo system is supposed to transmit signals in the L1 band at 1.57542 MHz. In addition, it also uses 1.023 Mcps pseudo-random noise (PN) sequences in that band. Once the entire Galileo satellite constellation is deployed, the combined number of visible GPS and Galileo satellites at any given time and location will be much higher than the number of visible satellites from the GPS system alone. This can be useful in, for example, urban canyon conditions, when the possibility of getting a fix can be limited by the number of visible satellites with direct line-of-sight. Thus, it can be useful to design a receiver that can handle both GPS and Galileo L1 signals at the same time. The present disclosure extends the benefits of combining GPS and Galileo receivers beyond the clear advantage of increased availability. It proposes a way of simplifying time ambiguity resolution when the signal of at least one Galileo satellite is available.

One of the signals being transmitted by Galileo satellites in the L1 band is the pilot channel—E1-C. It can consist of a PN sequence further modulated by a Binary Offset Carrier (BOC) technique. The PN sequence can be made of a primary sequence at 1.023 Mcps and 4,092 chips long, which consequently can last 4 ms, and a secondary PN sequence 25 chips long. The final PN sequence can repeat itself every 100 ms (4 ms×25). Within the context of an Assisted Global Navigation Satellite System (A-GNSS), a few assumptions can be useful.

First, the time difference between the Galileo system and the GPS system is known. This difference information can be transmitted by the Galileo satellites, which can mean this information can be obtained by demodulating the Galileo data. However, this can only be accomplished if the Galileo incoming signal is strong enough to allow data demodulation. Alternatively, this information can be sent to the terminal 120 by other means, for instance as part of assistance information from cellular network servers. Second, the terminal 120 knows its coarse location, typically within a 30 km radius, also called reference location. This knowledge may be based on assistance information or based on previous location fix information. Third, the terminal 120 has either the almanac, such as a coarse satellite location model, or ephemeris, such as a fine satellite location model, for all the satellites from the GPS and Galileo constellations involved. Fourth, the terminal 120 is able to acquire at least one GPS satellite and one Galileo satellite, which means that it is able to determine the code phase for the PN sequence correlation for these satellites. Fifth, the terminal 120 has at least coarse time information that is at least +/−3 seconds accurate based on A-GNSS aiding information or based on an internal clock source. As a consequence, the time search becomes limited to one or two 6-second long subframe(s).

Figure 2:
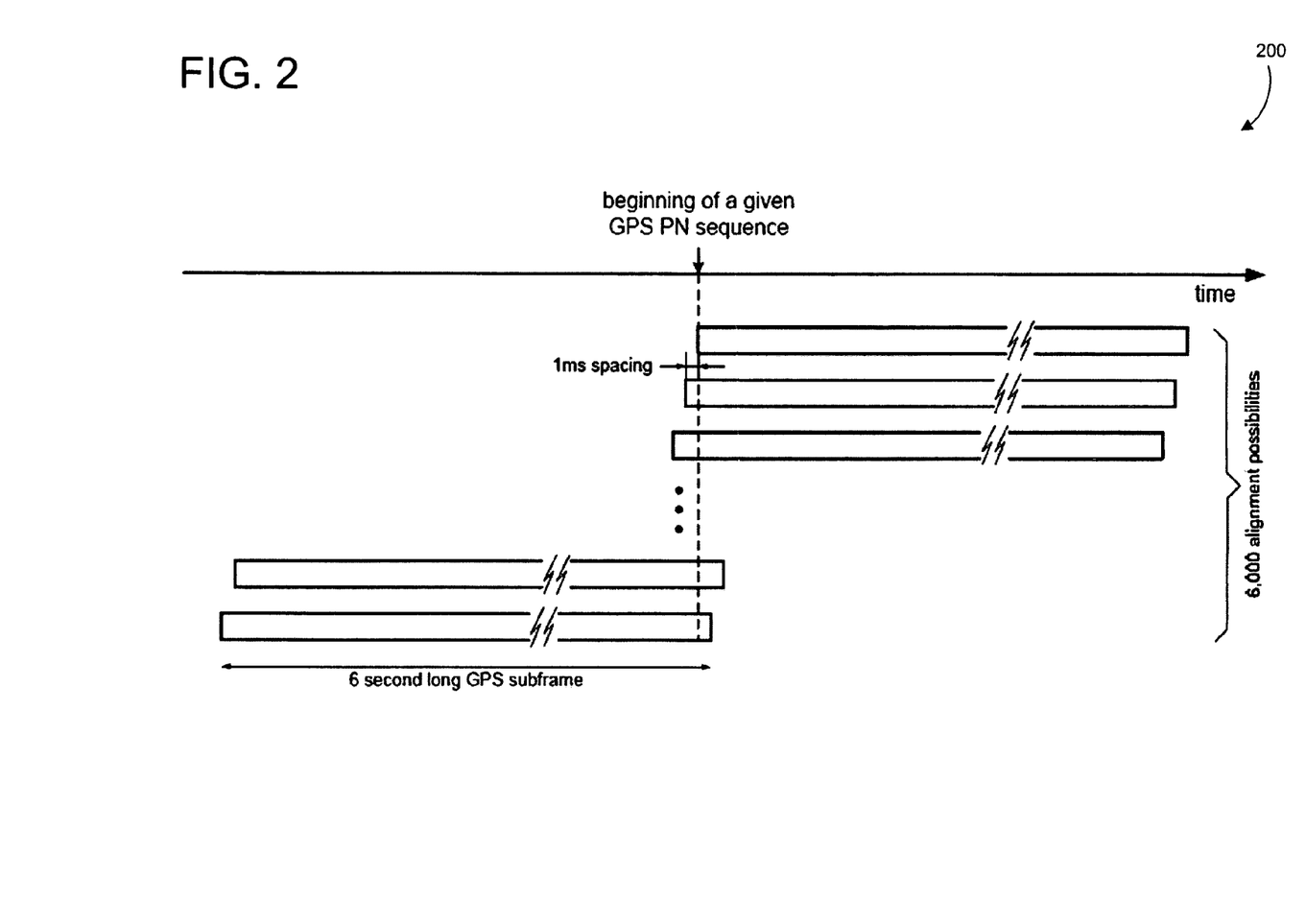
FIG. 2 is an exemplary illustration of subframe alignment possibilities for a given pseudo-random noise sequence according to one possible embodiment.

FIG. 2 is an exemplary illustration 200 of GPS subframe alignment possibilities for a given GPS PN sequence according to one possible embodiment. The time aiding information can +/−3 seconds accurate and, as shown, a given instant in time corresponding to the beginning of a given GPS PN sequence can correspond to 6,000 different possibilities in terms of subframe alignment.

Figure 3:
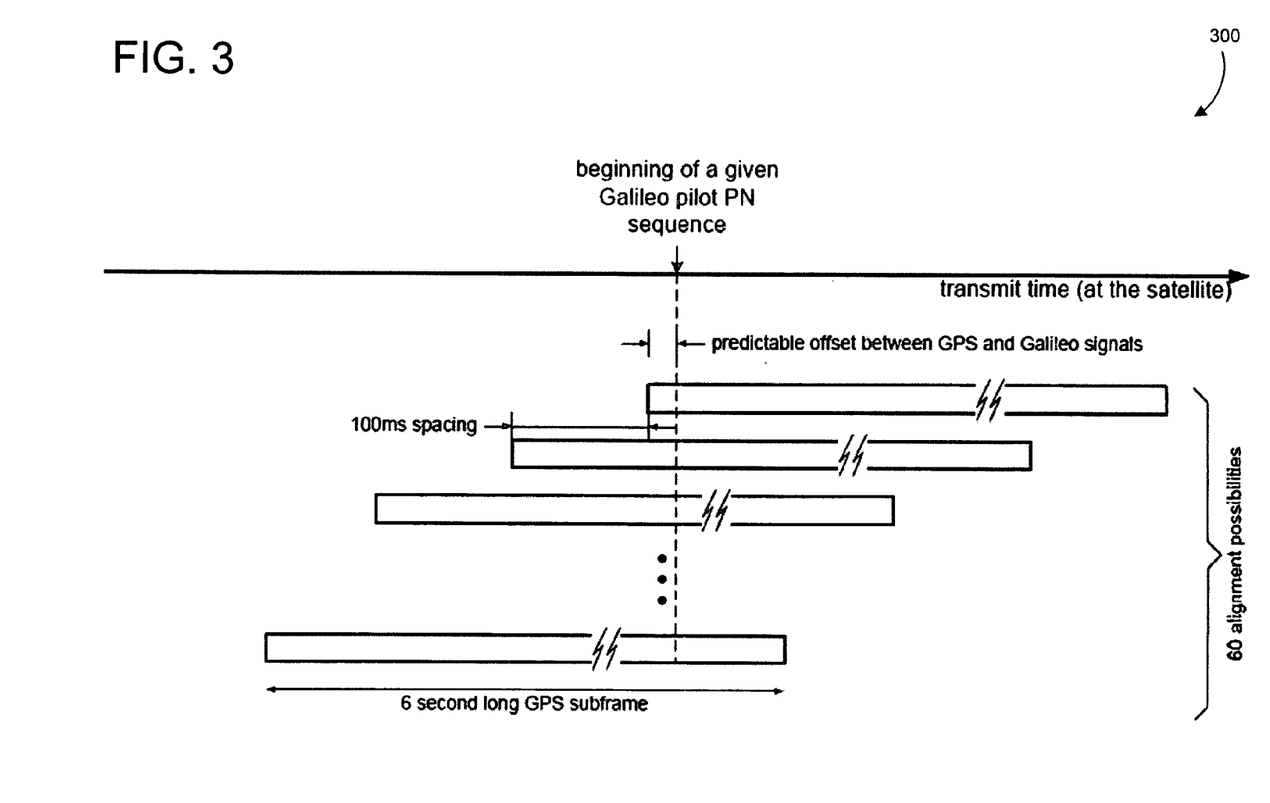
FIG. 3 is an exemplary illustration of a transmit time based subframe alignment possibilities for a given pilot pseudo-random noise sequence according to one possible embodiment.

FIG. 3 is an exemplary illustration 300 of transmit time based GPS subframe alignment possibilities for a given Galileo pilot PN sequence according to one possible embodiment. As shown, The E1-C Galileo pilot channel can provide the edge of the beginning of the 100 ms long PN sequence at the receiver time base, which can be the transmit time base at the satellite plus the propagation delay. Because the time difference between the Galileo system and the GPS system can be known, the beginning of a given 100 ms long Galileo PN sequence can correspond to 60 possible alignment locations in the 6 second long GPS subframe in terms of transmit time.

Figure 4:
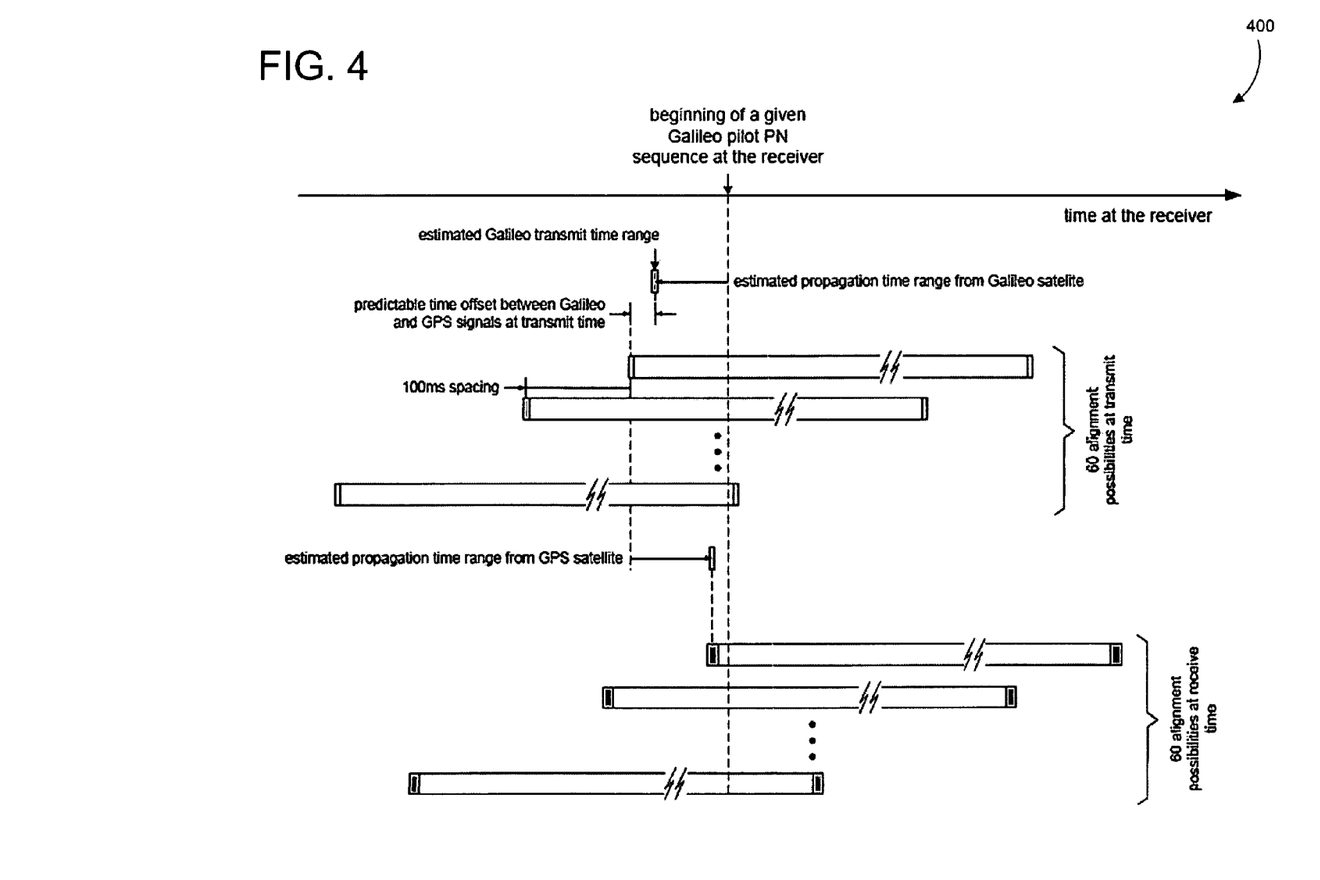
FIG. 4 is an exemplary illustration of receiver time based subframe alignment possibilities for a given pilot pseudo-random noise sequence according to one possible embodiment.

FIG. 4 is an exemplary illustration of receiver time based GPS subframe alignment possibilities for a given Galileo pilot PN sequence according to one possible embodiment. In terms of alignment as perceived by the terminal 120, the propagation delays between the satellites and the receiver should be taken into account. With the coarse reference location of the terminal 120 and with the Galileo orbit model, which can be almanac or ephemeris, it can be possible to estimate the propagation delay for the Galileo signal, and consequently estimate the transmit time for that signal within some good accuracy. With the Galileo to GPS time difference information, it can be possible to determine the possible time alignments between the beginning of Galileo's pilot PN sequence and the GPS subframe at its transmit time. With the GPS orbit models and the receiver reference location it can be possible to estimate the GPS propagation time for each satellite, the same way as with the Galileo satellites. In the end, it can be possible to determine the possible time alignments between the received pilot signal of a given Galileo satellite and the subframe of a given received GPS satellite, where both are referred in the receiver time. There can be 60 possible time alignments separated by 100 ms, the duration of the Galileo pilot PN sequence, each. Each possible alignment may have an uncertainty range mostly determined by the uncertainty of the reference location. These time uncertainties may be in the order of 100 µs for a 30 km position uncertainty. The 100 µs is much lower than the 1 ms step of the time ambiguity given by the GPS PN sequence correlation itself.

Because the uncertainty range for each possibility can be lower than 1 ms, each alignment possibility determined from the Galileo signal can correspond to only one possibility in the GPS PN sequence alignment. This shows that when combining the GPS PN sequence alignment with the Galileo pilot signal alignment, the search space can get reduced from 6,000 possibilities to 60 possibilities, which is a 100 fold improvement. In a more typical case, when the time aiding uncertainty is +/−2 seconds, the improvement can be from 4,000 possibilities to 40 possibilities, which is still a 100 fold improvement.

In U.S. Pat. No. 6,346,911, Mike King, which is hereby incorporated by reference, proposes one method to solve the time ambiguity. It makes use of known bit patterns within certain regions of the GPS subframe. For each time alignment possibility it performs a correlation making use of such known bit patterns. After the correlation is done for each time alignment possibility, it looks for a peak that will indicate the most likely correct time alignment. If the described method is used in combination with the present disclosure, the number of correlations necessary can decrease by a factor of 100, which can reduce the processing power needed.

Figure 5:
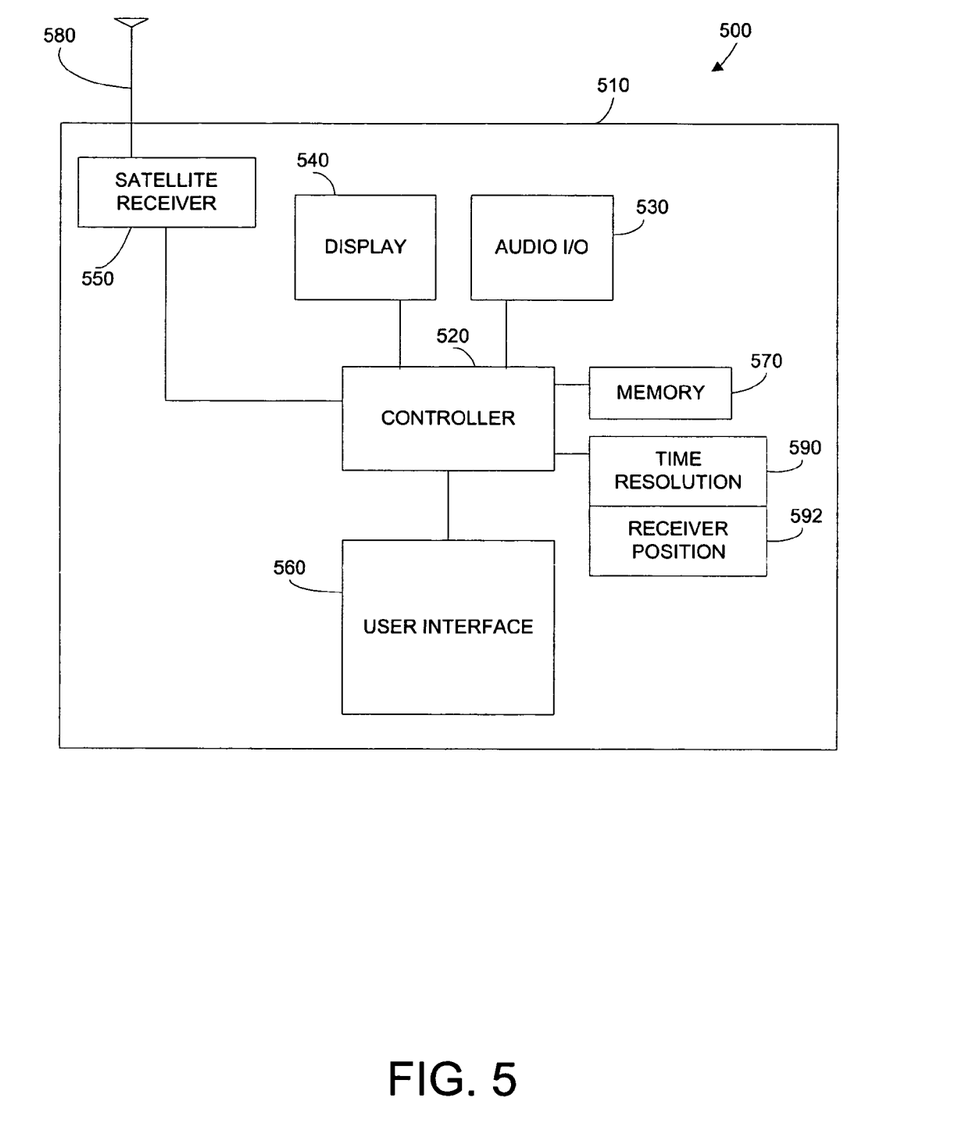
FIG. 5 is an exemplary block diagram of an apparatus according to one possible embodiment.

FIG. 5 is an exemplary block diagram of an apparatus 500, such as the terminal 120, according to one possible embodiment. The apparatus 500 can include some or all of a housing 510, a controller 520 coupled to the housing 510, audio input and output circuitry 530 coupled to the housing 510, a display 540 coupled to the housing 510, a satellite positioning system receiver 550 coupled to the housing 510, a user interface 560 coupled to the housing 510, a memory 570 coupled to the housing 510, and an antenna 580 coupled to the housing 510 and the satellite receiver 550. The apparatus 500 can also include a time resolution module 590 and a satellite positioning system receiver position module 592. The time resolution module 590 and the satellite positioning system receiver position module 592 can be coupled to the controller 520, can reside within the controller 520, can reside within the memory 570, can reside within the satellite receiver 550, can be autonomous modules, can be software, can be hardware, or can be in any other format useful for a module on a apparatus 500.

The display 540 can be a liquid crystal display (LCD), a light emitting diode (LED) display, a plasma display, or any other means for displaying information. The audio input and output circuitry 530 can include a microphone, a speaker, a transducer, or any other audio input and output circuitry. The user interface 560 can include a keypad, buttons, a touch pad, a joystick, an additional display, or any other device useful for providing an interface between a user and an electronic device. The memory 570 may include a random access memory, a read only memory, an optical memory, a subscriber identity module memory, or any other memory that can be coupled to a device.

In operation, the satellite positioning system receiver 550 can receive a first signal from a first satellite positioning system. The first signal can have a first modulation sequence length. The satellite positioning system receiver 550 can also receive a second signal from a second satellite positioning system. The second signal can have a second modulation sequence length different from the first modulation sequence length. The controller 520 can control the operations of the apparatus 500. The time resolution module 590 can estimate a propagation delay of signals from both satellite positioning systems. The time resolution module 590 can determine a time offset between the first signal from the satellite of the first satellite positioning system and the second signal from the satellite of the second satellite positioning system based on the estimated propagation delay for signals from both satellite positioning systems and a time offset between the systems. For example, the time resolution module 590 can determine a time offset between the first signal from the satellite of the first satellite positioning system and the second signal from the satellite of the second satellite positioning system based on a difference between the first modulation sequence length and the second modulation sequence length. The time resolution module 590 can reduce time alignment possibilities to resolve a problem with time ambiguity. For example, the time resolution module 590 can reduce the time alignment possibilities by using the time offset and a relative transmit time when deciding on a search space for aligning a pseudorandom noise sequence. The satellite positioning system receiver position module 592 can establish a position of the apparatus 500 based on the time offset. The second signal can be modulated by a pseudo random noise sequence that has a shorter length than the first signal. The first signal can include a pilot signal including a 100 millisecond pseudo-random noise sequence and the second signal can include a 6 second subframe.

The time resolution module 590 can estimate a propagation delay of the first signal from the satellite of the first satellite positioning system and estimate a second satellite positioning system system time of the second signal based on the propagation delay and the time offset. The satellite positioning system receiver position module 592 can establish a position of the apparatus 500 based on the second satellite positioning system system time. The time resolution module 590 can estimate the propagation delay by estimating a propagation delay of the first signal from the satellite of the first satellite positioning system based on a reference location of the satellite positioning receiver 550. The time resolution module 590 can also estimate a propagation delay by estimating a propagation delay of the first signal from the satellite of the first satellite positioning system based on an orbit model of the second satellite positioning system. The time resolution module 590 can additionally estimate a propagation delay by estimating a propagation delay of the first signal from the satellite of the first satellite positioning system based on coarse time information. The time resolution module 590 can also ascertain a transmit time for the first signal from the satellite of the first satellite positioning system based on the propagation delay. The time resolution module 590 can estimate a second satellite positioning system system time based on the transmit time and the time offset between the first and second satellite position systems.

The time resolution module 590 can estimate a propagation delay of the first signal from the satellite of the first satellite positioning system and ascertain a transmit time for the first signal from the satellite of the first satellite positioning system based on the propagation delay. The time resolution module 590 can then decide a search space for the second signal based on the transmit time and the time offset. A search space can narrow time possibilities to multiple possible system times. The time resolution module 590 can then estimate a second satellite positioning system system time based on the search space. For example, the time resolution module 590 can determine the most likely candidate for the system time from a candidate set using known methods. The satellite positioning system receiver position module 592 can establish a position of the apparatus 500 based on the second satellite positioning system system time. For example, the position module 592 can establish the position by getting a satellite position for each satellite, estimating a pseudo range for each satellite, and establishing the location of the apparatus 500 using the satellite position and the pseudo range. The pseudo range can be the distance between the satellite position receiver 550 and the respective satellite offset by a certain distance common to all the satellites.

The time resolution module 590 can estimate a propagation delay of the first signal from the satellite of the first satellite positioning system, decide a search space for time alignment possibilities for aligning a pseudorandom noise sequence based on the propagation delay and the time offset, and estimate a second satellite positioning system system time based on the search space. The satellite positioning system receiver position module 592 can then establish a position of the apparatus 500 based on the second satellite positioning system system time.

Figure 6:
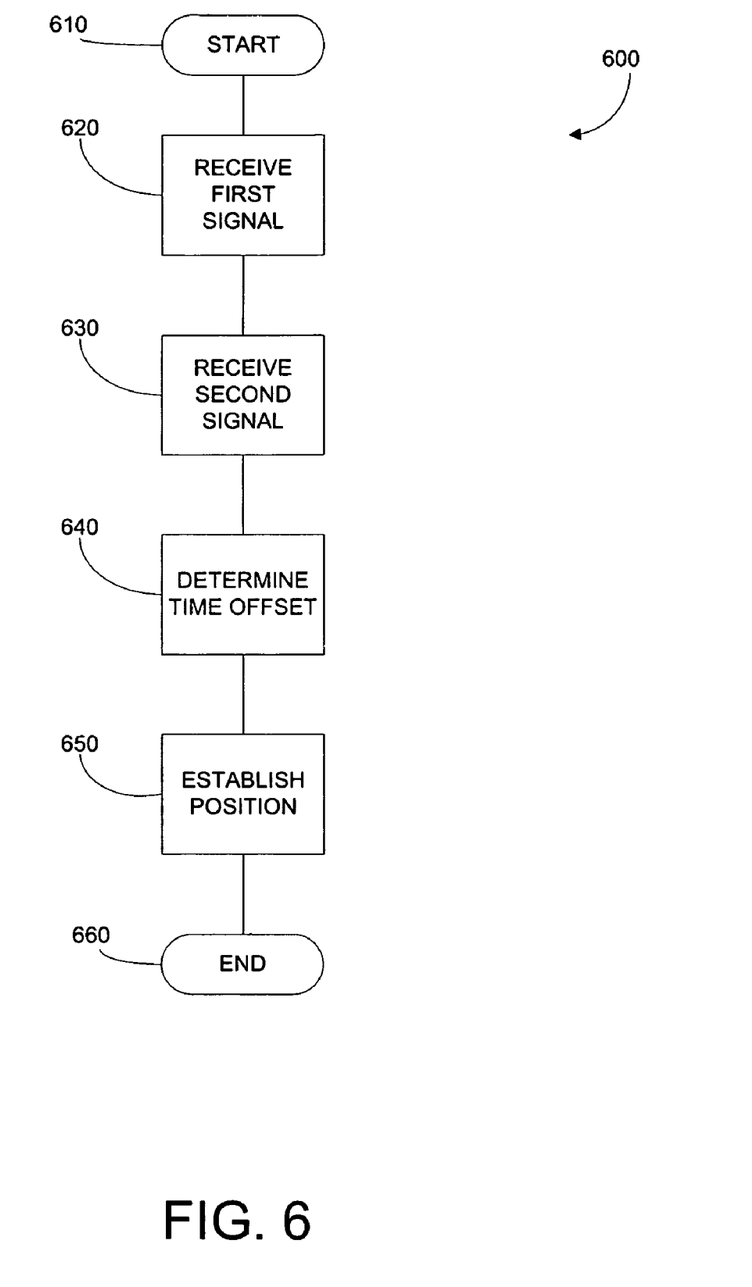
FIG. 6 is an exemplary flowchart illustrating the operation of an apparatus according to a possible embodiment.

FIG. 6 is an exemplary flowchart 600 illustrating the operation of the apparatus 500 according to another possible embodiment. In step 610, the flowchart begins. In step 620, the apparatus 500 can receive a first signal from a satellite of a first satellite positioning system, the first signal having a first modulation sequence length. The first signal can include a pilot signal including a 100 millisecond pseudo-random noise sequence. In step 630, the apparatus 500 can receive a second signal from a satellite of a second satellite positioning system, the second signal having a second modulation sequence length different from the first modulation sequence length. The second signal can be modulated by a pseudo random noise sequence that has a shorter length than the first signal. The second signal can also include a 6 second subframe. In step 640, the apparatus 500 can determine a time offset between the first signal from the satellite of the first satellite positioning system and the second signal from the satellite of the second satellite positioning system based on an estimated propagation delay of both signals and the difference between the first modulation sequence length and the second modulation sequence length. In step 650, the apparatus 500 can establish a position of the apparatus 500 based on the time offset. In step 650, the flowchart 600 ends.

Figure 7:
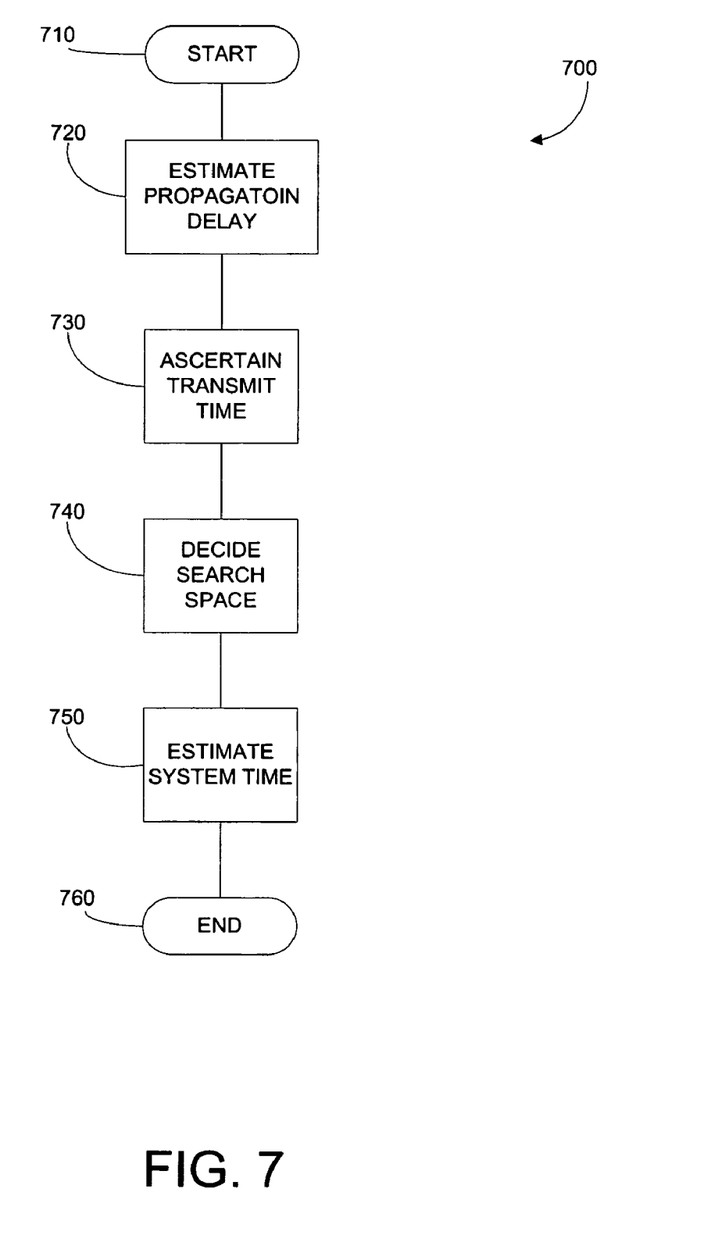
FIG. 7 is an exemplary flowchart illustrating the operation of an apparatus according to another possible embodiment.

FIG. 7 is an exemplary flowchart 700 illustrating the operation of the apparatus 500 according to another possible related embodiment where the steps can be implemented along with the steps of flowchart 600. In step 710, the flowchart begins. Not all of the steps in the flowchart 700 are necessary for the operation of flowchart 600. For example, in step 720, the apparatus 500 can estimate a propagation delay of the first signal from the satellite of the first satellite positioning system and in step 750, the apparatus 500 can estimate a second satellite positioning system system time of the second signal based on the propagation delay and the time offset. Estimating a propagation delay can include estimating a propagation delay of the first signal from the satellite of the first satellite positioning system based on a reference location of the satellite positioning receiver. Estimating a propagation delay can also include estimating a propagation delay of the first signal from the satellite of the first satellite positioning system based on an orbit model of the second satellite positioning system. Then, in step 650, the apparatus 500 can establish a position of a satellite positioning receiver based on the second satellite positioning system system time.

In step 730, the apparatus 500 can ascertain a transmit time for the first signal from the satellite of the first satellite positioning system based on the propagation delay. Then in step 750, the apparatus 500 can estimate a second satellite positioning system system time of the second signal based on the transmit time and the time offset. Then, in step 650, the apparatus 500 can establish a position of a satellite positioning receiver based on the second satellite positioning system system time.

In step 720, the apparatus 500 can estimate a propagation delay of the first signal from the satellite of the first satellite positioning system. In step 730, the apparatus 500 can ascertaining a relative transmit time for the first signal from the satellite of the first satellite positioning system based on the propagation delay. The transmit time may be a relative transmit time in that it is not necessarily absolute. For example, it can be redundant by a multiple of a duration of the first signal and still give the benefits of the present disclosure. As a further example, for a 100 ms signal, the relative transmit time may be off by a multiple of 100 ms. In step 740, the apparatus 500 can decide a search space for the second signal based on the transmit time and the time offset. In step 750, the apparatus 500 can estimate a second satellite positioning system system time based on the search space. Then, in step 650, the apparatus 500 can establish a position of a satellite positioning receiver based on the second satellite positioning system system time.

In step 720, the apparatus 500 can estimate a propagation delay of the first signal from the satellite of the first satellite positioning system. In step 740, the apparatus 500 can decide a search space for time alignment possibilities for aligning a pseudorandom noise sequence based on the propagation delay and the time offset. In step 750, the apparatus 500 can estimate a second satellite positioning system system time based on the search space. Then, in step 650, the apparatus 500 can establish a position of a satellite positioning receiver based on the second satellite positioning system system time. In step 750, the flowchart 700 ends.

Thus, the present disclosure can use a signal transmitted by satellites of a first system that can dramatically reduce the number of possible time alignment possibilities for a second system, and consequently, greatly simplify the time-ambiguity resolution problem. This can reduce the amount of processing power requirement, which can result in cheaper receiver implementations and/or faster response times.

For example, GPS and Galileo signals can be combined to solve the time ambiguity problem for GPS, whereas previous approaches relied on the use of signals from the same satellite system in order to extract time. Furthermore, the teachings of the present disclosure can be used in any receiver that can receive signals from two satellite positioning systems. For example, it can be used in hybrid receivers that are able to receive GPS and Galileo signals in the L1 band simultaneously. It can also be useful in Assisted-GPS (A-GPS) receivers, which include receivers built in mobile devices like cell phones. The present disclosure can be applicable to standalone receivers, where the whole receiver is self contained in one integrated circuit. It can also be applicable to all-software receiver implementations. It can additionally be applicable to correlator-based or FFT-based receivers.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. A method comprising:

receiving a first signal from a satellite of a first satellite positioning system, the first signal having a first modulation sequence length, the first signal including a Galileo pilot signal including a 100 millisecond pseudorandom noise pilot signal sequence;

receiving a second signal from a satellite of a second satellite positioning system, the second signal having a second modulation sequence length different from the first modulation sequence length, the second signal including a 6 second long Global Positioning System subframe, the Global Positioning System subframe including Global Positioning System pseudorandom noise sequences, each Global Positioning System pseudorandom noise sequence having a 1 millisecond length;

determining a time offset between the first signal Galileo pilot signal from the satellite of the first satellite positioning system and the second signal Global Positioning System subframe from the satellite of the second satellite positioning system based on an estimated propagation delay of the first signal and the second signal; and establishing a position of a satellite positioning receiver based on the time offset wherein the method further comprises:

estimating a propagation delay of the first signal Galileo pilot signal from the satellite of the first satellite positioning system;

ascertaining a relative Galileo pilot signal transmit time for the first signal Galileo pilot signal from the satellite of the first satellite positioning system based on the propagation delay;

deciding a search space for the second signal Global Positioning System subframe based on the Galileo pilot signal transmit time and the time offset between the first signal Galileo pilot signal and the second signal Global Positioning System subframe; and estimating a second satellite positioning system system time based on the search space, wherein establishing comprises establishing a position of a satellite positioning receiver based on the second satellite positioning system system time.

2. The method according to claim 1, wherein the second signal is modulated by a pseudo random noise sequence that has a shorter length than the first signal.

3. The method according to claim 1, wherein estimating a propagation delay comprises estimating a propagation delay of the first signal from the satellite of the first satellite positioning system based on a reference location of the satellite positioning receiver.

4. The method according to claim 1, wherein estimating a propagation delay comprises estimating a propagation delay of the first signal from the satellite of the first satellite positioning system based on an orbit model of the second satellite positioning system.

5. The method according to claim 1, wherein deciding a search space comprises deciding a search space for the second signal Global Positioning System subframe based on the Galileo pilot signal transmit time and the time offset between the first signal Galileo pilot signal and the second signal Global Positioning System subframe by corresponding the Galileo pilot signal 100 millisecond pseudorandom noise pilot signal sequence to possible alignment locations in the 6 second long Global Positioning System subframe.

6. An apparatus comprising:
a satellite positioning system receiver configured to receive a first signal from a first satellite positioning system, the first signal having a first modulation sequence length, the first signal including a Galileo pilot signal including a 100 millisecond pseudorandom noise pilot signal sequence, the satellite positioning system receiver also configured to receive a second signal from a second satellite positioning system, the second signal having a second modulation sequence length different from the first modulation sequence length, the second signal including a 6 second long Global Positioning System subframe, the Global Positioning System subframe including Global Positioning System pseudorandom noise sequences, each Global Positioning System pseudorandom noise sequence having a 1 millisecond length;
a controller coupled to the satellite positioning system receiver, the controller configured to control the operations of the apparatus;
a time resolution module coupled to the controller, the time resolution module configured to determine a time offset between the first signal Galileo pilot signal from the satellite of the first satellite positioning system and the second signal Global Positioning System subframe from the satellite of the second satellite positioning system based on an estimated propagation delay of the first signal and the second signal, estimate a propagation delay of the first signal Galileo pilot signal from the satellite of the first satellite positioning system, ascertain a relative transmit time for the first signal Galileo pilot signal from the satellite of the first satellite positioning system based on the propagation delay, decide a search space for the second signal Global Positioning System subframe based on the transmit time and the time offset, and estimate a second satellite positioning system system time based on the search space; and a satellite positioning system receiver position module coupled to the controller, the satellite positioning receiver position module configured to establish a position of the apparatus based on the second satellite positioning system system time.

7. The apparatus according to claim 5, wherein the second signal is modulated by a pseudo random noise sequence that has a shorter length than the first signal.

8. The apparatus according to claim 7, wherein the time resolution module is configured to estimate a propagation delay by estimating a propagation delay of the first signal from the satellite of the first satellite positioning system based on a reference location of the satellite positioning receiver.

9. The apparatus according to claim 7, wherein the time resolution module is configured to estimate a propagation delay by estimating a propagation delay of the first signal from the satellite of the first satellite positioning system based on an orbit model of the second satellite positioning system.

10. The method according to claim 6, wherein the time resolution module is configured to decide a search space by deciding a search space for the second signal Global Positioning System subframe based on the Galileo pilot signal transmit time and the time offset between the first signal Galileo pilot signal and the second signal Global Positioning System subframe by corresponding the Galileo pilot signal 100 millisecond pseudorandom noise pilot signal sequence to possible alignment locations in the 6 second long Global Positioning System subframe.

11. A method comprising:
receiving a first signal from a first satellite of a first satellite positioning system, the first signal including a Galileo pilot signal including a 100 millisecond pseudorandom noise pilot signal sequence;
receiving a second signal from a second satellite of a second satellite positioning system, the second signal including a 6 second long Global Positioning System subframe, the Global Positioning System subframe including Global Positioning System pseudorandom noise sequences, each Global Positioning System pseudorandom noise sequence having a 1 millisecond length;
ascertaining a relative transmit time of the first signal relative to an estimated propagation time of the first signal from the first satellite;
determining a time offset between the first signal Galileo pilot signal and the second signal Global Positioning System subframe;
deciding a search space for reduced time alignment possibilities for aligning a Global Positioning System pseudorandom noise sequence of the Global Positioning System pseudorandom noise sequences based on the relative transmit time and the time offset;
estimating a second satellite positioning system system time based on the search space; and
establishing a position of a satellite positioning receiver based on the second satellite positioning system system time.

12. The method according to claim 11, wherein the first satellite positioning system comprises a Galileo satellite positioning system and the second satellite positioning system comprises a Global Positioning System satellite positioning system.

13. The method according to claim 11, wherein deciding a search space comprises deciding a search space for the second signal Global Positioning System subframe based on the Galileo pilot signal transmit time and the time offset between the first signal Galileo pilot signal and the second signal Global Positioning System subframe by corresponding the Galileo pilot signal 100 millisecond pseudorandom noise pilot signal sequence to possible alignment locations in the 6 second long Global Positioning System subframe.

* * * * *